Feb. 20, 1923. 1,446,225.

M. E. THOMPSON.
MAGNETIC COUPLING.
FILED OCT. 19, 1917.

INVENTOR
Milton E. Thompson,
BY
Kenyon & Kenyon
his ATTORNEYS

Feb. 20, 1923.

M. E. THOMPSON.
MAGNETIC COUPLING.
FILED OCT. 19, 1917.

INVENTOR
Milton E. Thompson,
BY
Kenyon & Kenyon
his ATTORNEYS

Patented Feb. 20, 1923.

1,446,225

UNITED STATES PATENT OFFICE.

MILTON E. THOMPSON, OF RIDGWAY, PENNSYLVANIA.

MAGNETIC COUPLING.

Application filed October 19, 1917. Serial No. 197,415.

*To all whom it may concern:*

Be it known that I, MILTON E. THOMPSON, a citizen of the United States, and a resident of Ridgway, Elk County, State of Pennsylvania (whose post-office address is % Ridgway Dynamo & Engine Co., same place), have invented certain new and useful Improvements in Magnetic Couplings, of which the following is a specification.

My invention relates to a magnetic coupling constituting a means for connecting and disconnecting a driving and driven shaft.

The object of my invention is to produce an arrangement of the above character, which will be simple mechanically and effective in operation.

Further objects will be apparent from reading the following description taken in connection with the accompanying drawings forming a part hereof, and in which—

Figure 1:
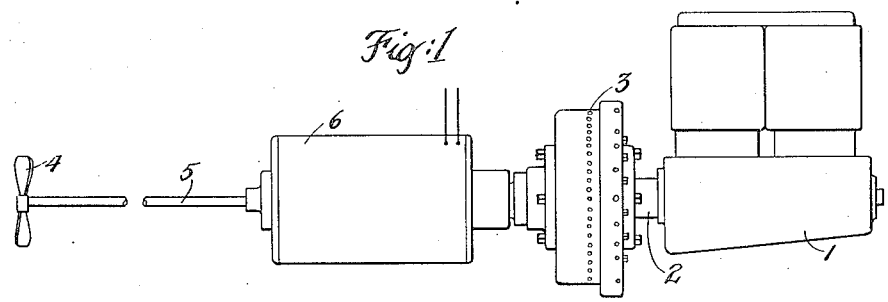
Fig. 1 shows an assembly view of a power system in which my coupling is employed.
Figure 3:
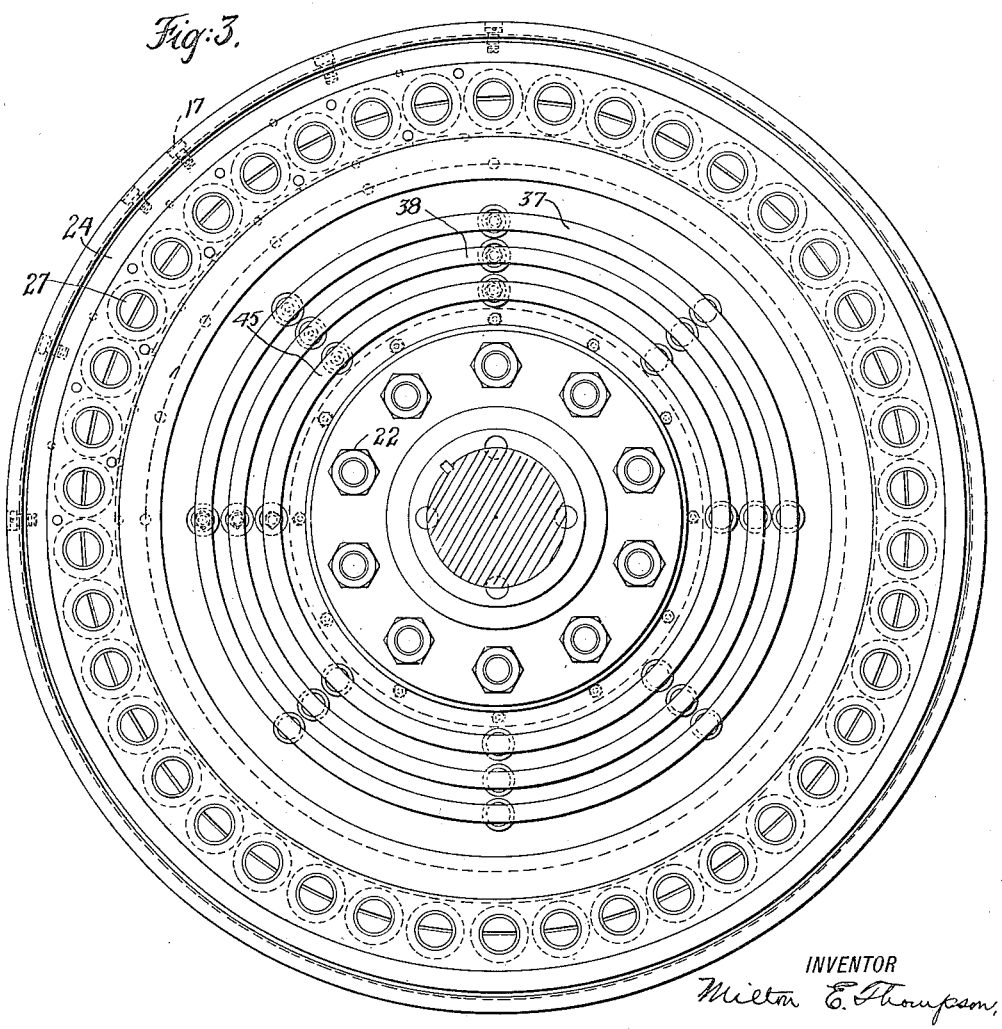
Fig. 3 shows a side elevation of the coupling looking in the direction of the arrows in Fig. 2.

Referring to Fig. 1, I show a power system, such, for example, as is employed in submarine boats wherein I have employed my improved coupling to advantage. This system comprises an engine 1, an engine shaft 2, my improved coupling 3, a propeller 4, a propeller shaft 5 and a dynamo-motor 6, the armature of which is connected directly to the propeller shaft 5. The engine 1 of the dynamo-motor 6 may be of any well known or desirable construction.

Figure 2:
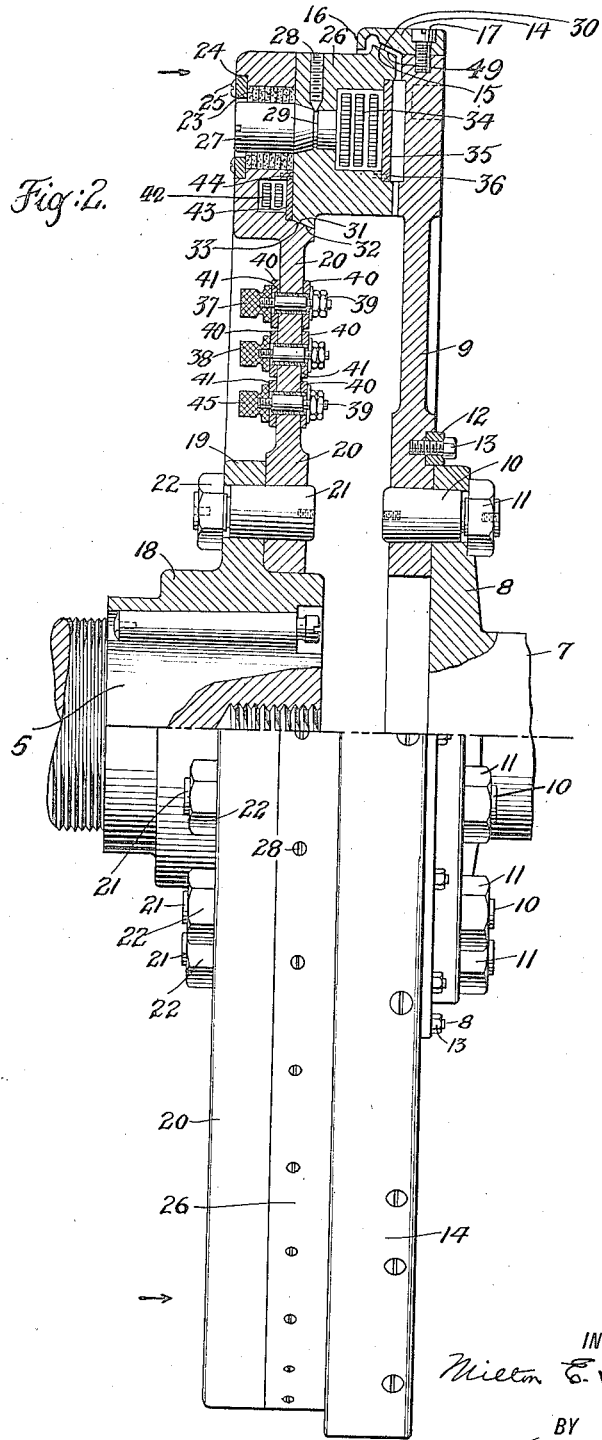
Fig. 2 shows the coupling partly in section.

The clutch or coupling 3, as shown in partial section in Fig. 2, is constructed as follows:—The member 7 is permanently fastened to the engine shaft in any suitable way. The member 7 has a flanged portion 8, which is provided with a series of openings near its periphery. Attached to the flange 8 is a disk shaped member 9 of magnetic material. The members 8 and 9 are fastened together by means of the tapered pins 10, which pins are forced into holding position by nuts 11. There may be any desired number of these pins. The member 9 has a circular groove cut therein, the same being cut so that its lower edge comes flush with the circumference of the flange 8. In this groove is placed a ring 12, the same being thicker than the depth of the groove, so that it laps the joint between the members 8 and 9. The ring 12 is held in place by a series of machine bolts 13.

Around the circumference of the member 9 is placed a non-magnetic member 14. The member 14 comes flush with the engine side of the member 9 but overhangs the edge of the member 9 on the other side. The overhanging portion of the member 14 is provided with a conical portion 15 and also depending portion 16. The member 14 is held in place by suitable means such as the machine screws 17.

Mounted on the propeller shaft 5 is a member 18. This member 18 has a flange 19 of substantially the same diameter as the flange 8. Mounted on the member 18 and against the flange 19 is a disk shaped member 20 of magnetic material. This disk is fastened to the flange 19 by means of tapered pins 21 forced into position by nuts 22 in substantially the same way as the pins 10 and nuts 11. The disk 20 is increased in thickness near its circumference and is provided with a series of openings extending circumferentially therearound. In each of these openings is placed a plurality of leather washers 23. These washers are held in place by a metal ring 24 which is fastened to the disk 20 by screws 25.

Located between the disks 9 and 20 is a magnetic member 26. Mounted in one side of the member 26 is a series of pins 27, there being the same number of pins 27 as there are openings in the periphery of the disk 20. These pins are fastened in the member 26 by pointed screw pins 28, the point of each of the screws 28 entering a groove 29 in the pins. The pins 27 which project from the side of the member 26 project into the openings in the disk 20 and come into bearing contact with the edges of the leather washers 23 and by means of the pins 27, the member 26 is supported in position between the disks 9 and 20. The arrangement is such that the member 26 is permanently connected with the member 20. There is no substantial relative rotative movement between the members 20 and 26, but by reason of the sliding pin arrangement a substantial movement of the member 26 toward or away from the member 20 is permitted. The member 26 is provided with a slight flange portion 49 which has a conical shaped periphery 30. This conical shaped portion is the same as the conical portion 15 of the ring 14, and when the member 26 is moved to the right, these two conical surfaces come into contact, and the surface 15 acts to center the member 26 with respect to the disks 9 and 20.

The member 26 is also provided with a small flange portion 31 having a conical shaped periphery 32. The disk member 20 is also provided with a conical shaped shoulder 33, the conical shaped portions of the members 20 and 26 being the same, so that they come in contact when the member 26 is moved to the left as shown in Fig. 2. This conical shoulder 33 on the disk 20 acts to center the member 26 when it is moved away from the member 9.

Mounted within the member 26 is a coil 34. This coil is held in position by means of a ring 35 which is attached to the member 26 by screws 36. The coil 34 is electrically connected with the slip rings 37 and 38. These slip rings are mounted upon the disk 20 by means of bolts 39. They are insulated from the disk 20 by means of washers 40 and bushings 41.

Mounted in the member 20 is a coil 42. This coil is held in place by a member 43 which is attached to the member 20 by screws 44. The coil 42 is connected with slip rings 38 and 45. The ring 45 is mounted on the member 20 in the same fashion as the rings 37 and 38. The rings 37, 38 and 45 are connected to a suitable source of power not shown.

The operation of the device is as follows:— The engine is started in any well known way, and therefore the member 9 and its associated parts revolve with the engine shaft. If the engine is to drive the propeller 4, the circuit to the coil 34 is closed whereupon the member 26 becomes magnetized and is drawn into contact with the member 9. This movement places the member 26 into driving contact with the member 9 and it is kept in proper position by the conical shaped surface 15 of the member 14. The member 26 is provided with inner and outer annular bearing or engaging surfaces of reduced dimensions as compared to the main body thereof, whereby the magnetic flux is concentrated to a comparatively small area at the point of engagement with the driving disk 9, the latter having corresponding reduced annular bearing surfaces. This insures a firm frictional grip. The movement of the member 26 to the right in Fig. 2 draws the pins 27 a corresponding distance to the right through openings in the member 20, but does not of course, move the pins 27 to such an extent that they are removed from the openings. The engine 1, under these conditions drives the propeller 4 and the dynamo-motor 6 through the member 9, the member 26, the pins 27 and disk 20. Under these conditions the machine 6 would act as a dynamo to perform any useful service such as charging storage batteries, lighting lamps or any other desired duty. When it is desired to disconnect the engine from the propeller, the circuit to the coil 34 is broken and the circuit to the coil 42 is closed, whereupon the member 26 is positively withdrawn from contact with the member 9 and brought into the position shown in Fig. 2 where the clutch is entirely disconnected.

In service, it is not infrequently desirable to drive the propeller without the engine 1. When it is desired to so operate the device, the clutch 3 performs no function with respect to the engine but does perform the important function of furnishing a substantial fly-wheel action for the machine 6, which is at that time acting as a motor to drive the propeller 4, and is itself driven from any suitable source such as storage batteries. This fly-wheel action is accentuated by the fact that the mass of the member 26, which is substantial, is added to that of the member 20, the mass of the member 9 in this instance being relatively small.

The arrangement above described has particular advantages when applied to submarines in the use of which it is frequently desirable to operate the submarine without the engine, this of course being desirable when the craft is submerged. When it comes to the surface again, however, it is propelled, by the engine, which at the same time drives the machine 6 as a dynamo and charges storage batteries in any well known way.

It is understood that I am not to be limited to the exact arrangement shown in the drawings. The members 9 and 20 might be reversed by placing the member 20 on the engine shaft and the member 9 on the propeller shaft without departing from the spirit of my invention, and many other slight changes might be made without in any way departing from the spirit thereof. The arrangement shown in the drawings, however, constitutes the preferred form of my invention.

Having described my invention, what I claim as new and desire to secure by Letters Patent is:

1. In a device of the character described, a driving shaft and a flanged member thereon, a driven shaft and a flanged member thereon, a magnetic friction member between said members and mounted on one of said members so as to move toward and away therefrom, but non-rotatable with respect thereto, means carried by said friction member for magnetizing said friction member and moving it into contact with the other flange member, and magnetic means carried on the flange member upon which said friction device is mounted for moving said friction device away from the other flange member.

2. In a device of the character described, a driving shaft, a disk shaped clutch member rigidly mounted thereon, a driven shaft, a driven clutch member on said driven shaft having a plurality of openings therein, an intermediate magnetic member having projections extending into the openings in said driven member, said intermediate member being movable with respect to said driven member, a non-magnetic rim on said driving clutch member arranged to overhang said member and center said intermediate member therewith, and electro-magnetic means for moving said intermediate member into frictional driving contact with said driving member and magnetic means for separating said intermediate member from said driving member.

3. In a device of the character described, a driving and a driven member each rigidly fixed to its respective shaft and an intermediate member in permanent driving connection with one of said members, said intermediate member being adapted to be brought into driving connection with the other member also and means for shielding the driving connection between the intermediate member and the clutch member in temporary contact therewith and for also centering said intermediate member with respect to said clutch member, magnetic means mounted on the intermediate member for bringing it into driving relation with the driving member and magnetic means carried by the member supporting said intermediate member for withdrawing said intermediate member from the driving member and reduced magnetic surfaces on the intermediate member for engaging the driving member and the driven member.

4. In a device of the character described, a driving and a driven member each rigidly fixed to its respective shaft and an intermediate member in permanent driving connection with one of said members, said intermediate member being adapted to be brought into driving connection with the other member also, a non-magnetic portion on one member having a conical portion for centering said intermediate member with respect to said member and a conical magnetic portion on the other member for centering said intermediate member in its other movement and magnetic means for moving the intermediate member in both directions.

5. In a device of the character described, a driving shaft, a disk shaped clutch member rigidly mounted thereon, a driven shaft, a disk shaped clutch member rigidly mounted thereon, an intermediate clutch member, means permanently connecting said intermediate member to said driven member but permitting longitudinal movement relative thereto, said means including a plurality of pins, electro-magnetic means for frictionally connecting said intermediate member with the driving clutch member and means for shielding and centering the contacting surface between said intermediate member and said driving clutch member and magnetic means for releasing said intermediate member from said driving member.

6. In a device of the character described, the combination of two members at a substantially fixed distance apart, an intermediate member kept in permanent connection with one of said members by means which permit said intermediate member to be moved into frictional driving connection with the other member, electro-magnetic means for moving said intermediate member into driving connection with said member, electromagnetic means for disconnecting it therefrom and means for centering said intermediate member in both movements.

7. In a device of the character described, the combination of a disk shaped magnetic driving member, a disk shaped driven member, a non-magnetic member mounted on the driving member and overhanging said member and having a conical shaped portion, an intermediate magnetic member having a conical portion adapted to engage the conical portion of said non-magnetic member, a conical magnetic portion in said driven member, a corresponding conical portion on said intermediate member, means mechanically connecting said intermediate member to said driven member and an electro-magnetic means for connecting said intermediate member with the driving member and electro magentic means for moving the conical portions of said driven and intermediate portions into contact.

8. In a device of the character described, a driving shaft carrying a flange member, a driven shaft carrying a flange member, a magnetic friction device mounted on one of said members so as to move toward and away therefrom but non-rotatable with respect thereto, means carried by said friction device for magnetizing the same and moving it into contact with the other of said members, and magnetic means carried by the flanged member upon which the said friction device is mounted for moving said friction device into inoperative position.

9. In a device of the character described, a driving member, a driven member, a magnetic friction device between said members and mounted on the driven member so as to move toward and away therefrom but non-rotatable with respect thereto, a magnetic coil carried by said friction device for magnetizing the same and bringing it into operative engagement with the driving member, a magnetic coil carried by the driven member and adapted to withdraw the friction member out of operative engagement with the driving member, when the first named coil is de-energized, and slip rings carried by the driven member for effecting connection of the magnetic coils with a source of power.

In testimony whereof, I have signed my name to this specification.

MILTON E. THOMPSON.